US012560345B2

(12) United States Patent
Martin

(10) Patent No.: US 12,560,345 B2
(45) **Date of Patent: *Feb. 24, 2026**

(54) DOWNDRAFT AIR CIRCULATION AND FILTRATION SYSTEM FOR VOCAL MUSIC AND BAND ENSEMBLES

(71) Applicant: Jeff Martin, Sterling Heights, MI (US)

(72) Inventor: Jeff Martin, Sterling Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,191

(22) Filed: Apr. 19, 2024

(65) Prior Publication Data

US 2024/0280282 A1 Aug. 22, 2024

Related U.S. Application Data

(63) Continuation of application No. 17/365,617, filed on Jul. 1, 2021, now Pat. No. 11,988,410.

(60) Provisional application No. 63/052,492, filed on Jul. 16, 2020.

(51) Int. Cl.

| | |
|---|---|
| ***G09G 3/3266*** | (2016.01) |
| ***F24F 9/00*** | (2006.01) |
| ***G10G 7/00*** | (2006.01) |

(52) U.S. Cl.

CPC ................. *F24F 9/00* (2013.01); *G10G 7/00* (2013.01)

(58) Field of Classification Search

CPC .. F24F 9/00; F24F 2221/08; F24F 8/22; F24F 8/20; F24F 3/16; F24F 13/085; F24F 13/28; F24F 2003/008; F24F 3/167; G01G 7/00; A47C 1/00; A47C 1/12; B60P 3/0252; A63J 1/00; A63J 2005/005; A63J 2005/006; A63J 2005/007

USPC .......................................................... 454/191

See application file for complete search history.

(56) References Cited

U.S. PATENT DOCUMENTS

| | | | | |
|---|---|---|---|---|
| 3,407,719 | A | 10/1968 | Temple et al. | |
| 4,409,889 | A | 10/1983 | Burleson | |
| 5,577,350 | A | 11/1996 | Brisbin et al. | |
| 5,816,908 | A | 10/1998 | Tsou | |
| 6,162,270 | A | 12/2000 | Nystrom et al. | |
| 6,226,568 | B1 * | 5/2001 | Tong | B05B 16/60 454/52 |
| 6,626,971 | B1 | 9/2003 | Forbert et al. | |
| 10,472,838 | B1 | 11/2019 | MacGregor | |
| 10,918,758 | B1 | 2/2021 | Bess | |
| 2007/0202798 | A1 | 8/2007 | Billiotte et al. | |
| 2010/0003912 | A1 | 1/2010 | Jeng et al. | |
| 2012/0131861 | A1 | 5/2012 | Hosking et al. | |
| 2017/0003042 | A1 | 1/2017 | Schafer et al. | |
| 2017/0336087 | A1 | 11/2017 | Shin | |
| 2021/0339183 | A1 | 11/2021 | Hourani et al. | |

FOREIGN PATENT DOCUMENTS

| | | | | |
|---|---|---|---|---|
| GB | 2215234 A * | 9/1989 | | A61L 9/16 |
| WO | 2019138304 A1 | 7/2019 | | |

* cited by examiner

*Primary Examiner* — Avinash A Savani

(74) *Attorney, Agent, or Firm* — Carlson, Gaskey & Olds, P.C.

(57) ABSTRACT

An air circulation system for vocal music and band ensembles provides a downdraft through a riser structure to remove aerosols from around performers in the riser structure. The riser structure includes platforms and an air intake disposed within a vertical space between the platforms. The aerosols are drawn through the riser structure, cleaned, and filtered and exhausted away from the performers.

15 Claims, 4 Drawing Sheets

DOWNDRAFT AIR CIRCULATION AND FILTRATION SYSTEM FOR VOCAL MUSIC AND BAND ENSEMBLES

CROSS REFERENCE TO RELATED APPLICATION

This application is a continuation of U.S. patent application Ser. No. 17/365,617 filed on Jul. 1, 2021, which claims priority to U.S. Provisional Application No. 63/052,492 filed on Jul. 16, 2020.

TECHNICAL FIELD

The present disclosure relates to air circulation and filtration systems for reducing the spread of airborne aerosols in a vocal music and band environment.

BACKGROUND

Safety is a concern for everyone including vocal and music performers during a pandemic. Disease specialists and environmental specialists have demonstrated that the aerosol effect from singing can enhance the spread of airborne viruses and pathogens. Respirator style masks are effective at filtering particulates from air and full-face shields may also be somewhat effective, but create vocal/acoustic problems while also detracting from the performance and are not practical in vocal and music performance and practice settings.

The background description provided herein is for the purpose of generally presenting a context of this disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

An air circulation system for vocal music and band ensembles according to a disclosed example embodiment includes, among other possible things, a riser structure including platforms, an air intake disposed within a vertical space between the platforms and an airflow generator configured to draw air into the air intake. An exhaust duct is further provided for directing airflow away from the riser structure.

In another disclosed embodiment of the foregoing air circulation system, at least one filter is disposed between the air intake and the airflow generator for removing particulates within the air drawn through the air intake.

In another disclosed embodiment of any of the foregoing air circulation systems, a decontamination device is disposed between the intake and the airflow generator for treating air drawn through the intake.

In another disclosed embodiment of any of the foregoing air circulation systems, the decontamination device comprises an ultraviolet light.

In another disclosed embodiment of any of the foregoing air circulation systems, the riser structure comprises a plurality of platforms and the air intake includes a plurality of air intakes disposed within the vertical space between at least two of the plurality of platforms.

In another disclosed embodiment of any of the foregoing air circulation systems, the riser structure defines an inner chamber open to inlet airflow through the air intake.

In another disclosed embodiment of any of the foregoing air circulation systems, a shroud is disposed along three sides of the riser structure, the shroud extending to a height above a top one of the platforms.

In another disclosed embodiment of any of the foregoing air circulation systems, the shroud includes a top portion covering at least a portion of the riser structure.

In another disclosed embodiment of any of the foregoing air circulation systems, the shroud support structure includes at least one inflatable frame held upright at least partially by a flow of air.

In another disclosed embodiment of any of the foregoing air circulation systems, the exhaust duct directs a portion of the airflow over the riser structure.

A riser structure for vocal music and band ensembles according to another disclosed embodiment includes, among other possible things, a plurality of platforms, an inner chamber disposed below the plurality of platforms and at least one air intake in flow communication with the inner chamber. The air intake is disposed within a vertical space between at least two of the plurality of platforms. An airflow generator is in flow communication with the inner chamber and configured to draw air into the inner chamber through the at least one air intake and an exhaust duct for directing air drawn into the air intake away from the riser structure.

In another disclosed embodiment of the foregoing riser structure, at least one filter is disposed between the air intake and the airflow generator for removing particulates within the air drawn through the air intake.

In another disclosed embodiment of any of the foregoing riser structures, a decontamination device is disposed between the intake and the airflow generator for treating air drawn through the intake.

In another disclosed embodiment of any of the foregoing riser structures, a fresh air return duct communicates airflow exhausted from the at least one filter to a position over the plurality of platforms.

In another disclosed embodiment of any of the foregoing riser structures, the air intake comprises a plurality of air intakes disposed within each vertical space between the plurality of platforms.

In another disclosed embodiment of any of the foregoing riser structures, a shroud is disposed along three sides of the riser structure, the shroud extending to a height above a top one of the plurality of platforms.

In another disclosed embodiment of any of the foregoing riser structures, a shroud support structure includes at least one inflatable frame held upright at least partially by a flow of air.

A method of removing aerosol particulates over a riser structure for vocal and band ensembles according to another disclosed embodiment includes, among other possible things, sealing a space under a plurality of platforms to define an inner chamber, generating a reduced pressure within the inner chamber with an airflow generation device in communication with the inner chamber, drawing air from above the plurality of platforms through at least one air intake vent disposed within a vertical space between at least two of the plurality of platforms and exhausting the drawn in air from the inner chamber away from the music riser structure.

Another disclosed embodiment of the foregoing method, further comprises communicating air drawn from the inner chamber through a filter to remove at least some of the aerosol particulates.

Another disclosed embodiment of any of the foregoing methods further comprises communicating air drawn from the inner chamber through a decontamination device to treat the air an destroy at least some of pathogens within the air.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
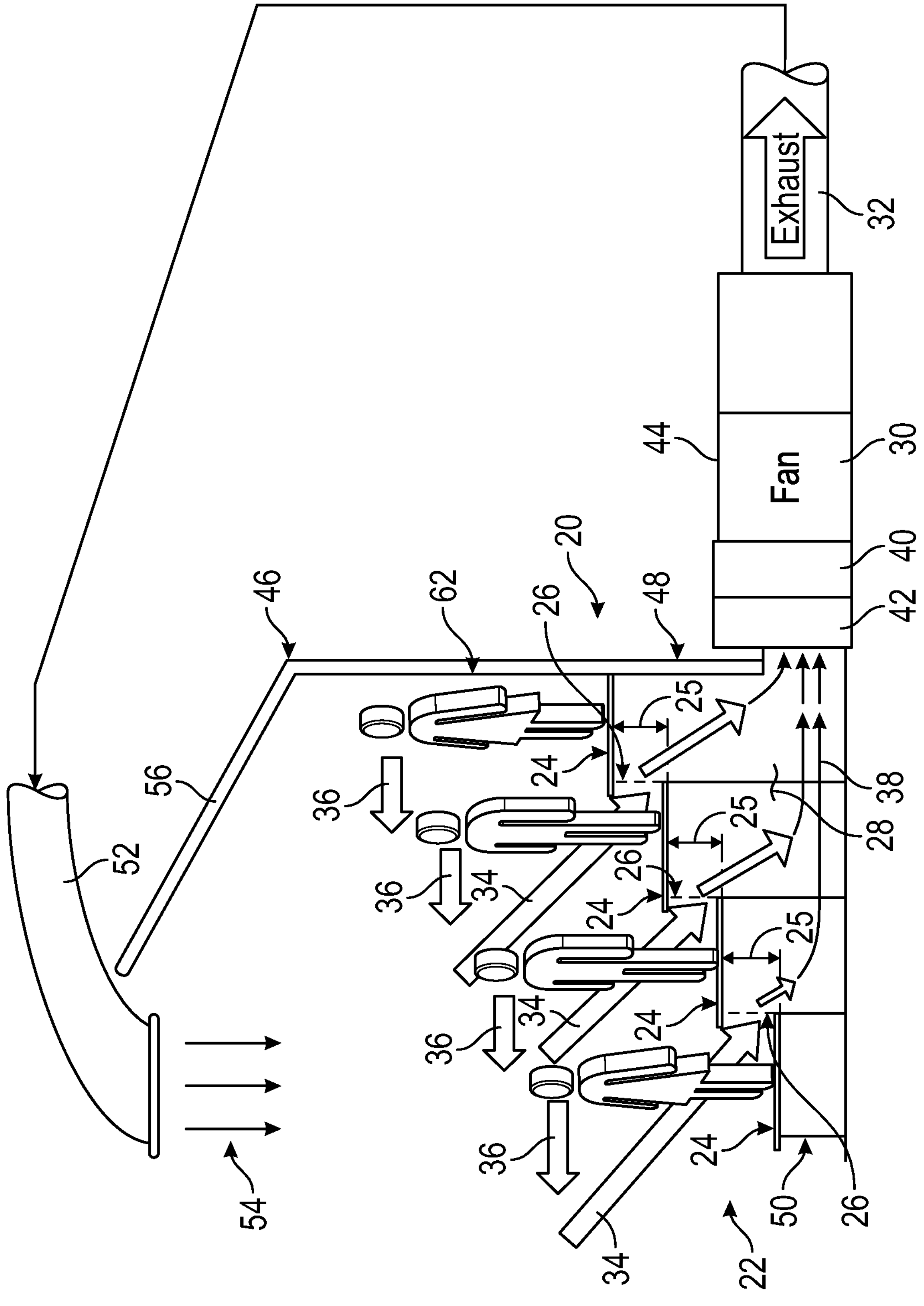
FIG. 1 is a schematic view of a disclosed embodiment of an air circulation system for vocal music and band ensembles.
Figure 2:
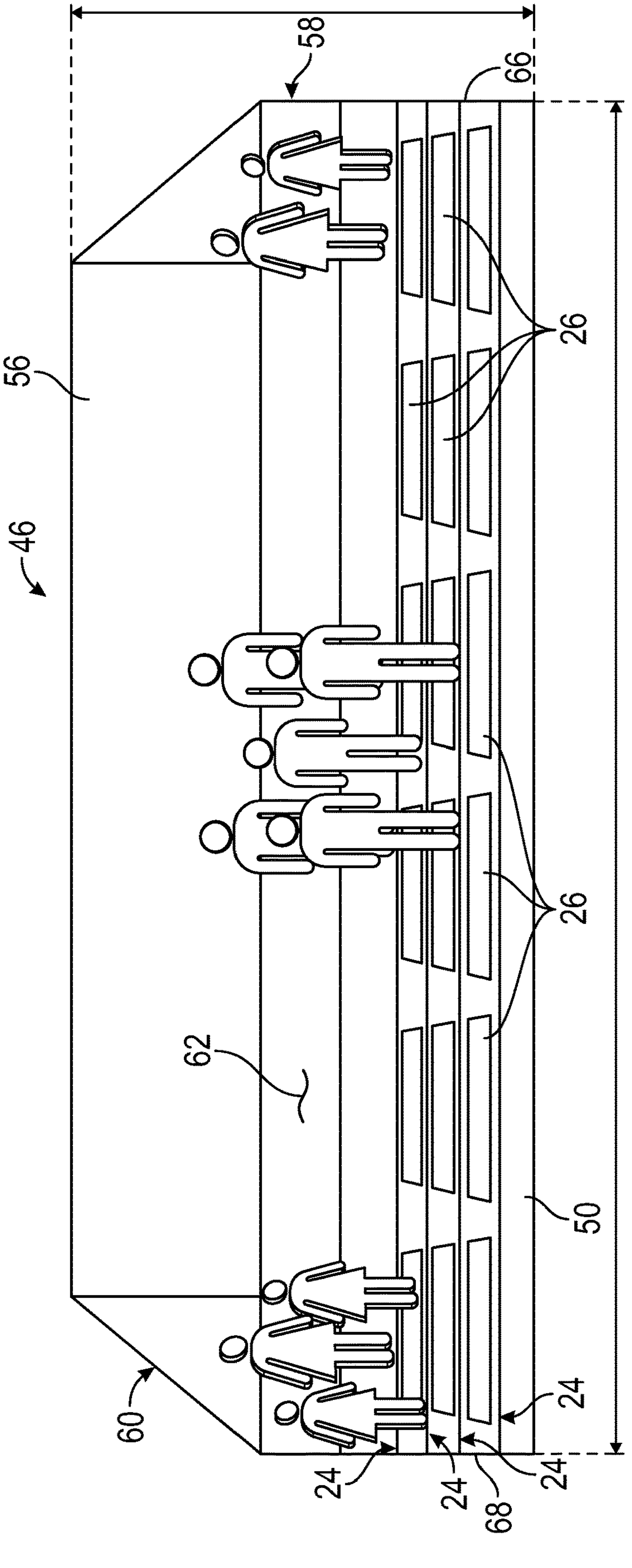
FIG. 2 is a front view of a disclosed example riser structure of an air circulation system for vocal music and band ensembles.

Referring to FIGS. 1 and 2 an air circulation system for use in vocal music and band ensembles is schematically shown and indicated at 20. The system 20 includes a riser structure 22 for supporting performers at different heights. Performers generate airborne aerosols schematically indicated at 36. The airborne aerosols will linger for a time within the proximity of other performers on the riser structure 22. The airborne aerosols can create an environment for transmission of airborne germs and viruses. The example system 20 provides for the quick evacuation of the airborne aerosols to substantially reduce exposure to other performers and anyone else in proximity of the performers.

The system 20 includes a plurality of air intakes 26 disposed within a vertical space 25 between platforms 24 of the riser structure 22. The riser structure 22 is sealed by a back wall 48, a front wall 50 and side walls 66, 68. Sealing of the riser structure 22 defines an inner chamber 28 in the volume within the riser structure 22. A fan 30 produces a flow of air 38 out of the inner chamber 28. The air flow 38 generated by the fan 30 creates a low pressure within the inner chamber 28 that is lower than the pressure outside of the riser structure 22. The low pressure draws the airborne aerosols 36 produced by the performers downward as indicated at 34 and into the air intakes 26. The downdraft 34 produced substantially reduces the time that the airborne aerosols linger around the performers. Moreover, the downdraft substantially prevents the airborne aerosols from migrating away from the riser structure 22 and into a room including the riser structure.

The riser structure 22 is shown by example as including a plurality of platforms 24 for elevating the performers above a floor. The riser structure 22 is an example of a structure that would be utilized for a vocal choir group during a performance and during rehearsals. The riser structure 22 may be of the type utilized in schools, churches, theaters, or any other performance and/or rehearsal venue. Moreover, the example riser structure 22 may be a choral riser with platforms 24 of a width to accommodate a standing performer. The riser structure 22 may also in in include platforms 24 of larger widths to accommodate equipment and chairs for a band ensemble. It should be appreciated, that the width of each of the platforms 24 may be varied within the scope of this disclosure to accommodate any performers with and/or without equipment in both sitting and standing postures. The riser structure 22 may be permanent structure or may be portable. Moreover, the load bearing structure of the example riser structure 22 may of any known construction and all are within the contemplation and scope of this disclosure.

The inner chamber 28 is of a shape dependent on the riser structure 22 and provides for the generation of low pressure area to create a downdraft indicated by the arrows 34 to draw airborne aerosols away from the performers standing on the platforms 24. The example air intakes 26 are of a size and shape to fit within a vertical space between the platforms 24. The area of the air intakes 26 can be the entire vertical space 26 or some smaller portion of that vertical space. The size and shape of the air intakes 26 are selected to produce the desired downdraft to pull the airborne aerosols into the inner chamber 28. Accordingly, the size of the inner chamber 28 and the air flow produced by the fan 30 are considerations in determining the flow area for the air intakes 26. It should be appreciated, that different air intake shapes and sizes are within the scope and contemplation of this disclosure.

Air flow drawn into the inner chamber 28 is pulled through a filter 40 and a decontamination device 42. The filter 40 and decontamination device 42 are disposed between the inner chamber 28 and the fan 30. Accordingly, air leaving the inner chamber 28 is filtered and decontaminated prior to entering the fan 30. In this example, the fan 30, filter 40 and decontamination device 42 are disposed within an enclosure 44. The enclosure 44 may be single structure or a combination of different structures attached to each other.

In this example, the filter 40 is a replaceable filter with a rating that provides for removal of most common viruses and germs. Filters are rated according to minimum efficiency reporting value (MERV). In one disclosed example, the filter 40 is of a a MERV 16 rating or higher. The filter 40 may be replaceable or be permanent filter that is periodically cleaned. The filter 40 may be of a high efficiency particulate air (HEPA) filter. It should be understood that any air filter configuration could be utilized and such filters are within the contemplation and scope of this disclosure.

The example decontamination device 42 is an ultraviolet (UV) air purification device that uses ultraviolet light to destroy viruses and bacteria in the air. The ultraviolet light may be of any type utilized in UV air purification devices. Moreover, other air purification devices may also be utilized and are within the contemplation and scope of this disclosure.

The fan 30 is an electric powered fan that generates an airflow sufficient to create the desired downdraft 34 down through the riser structure. The fan 30 may be blower type fan utilized in heating and cooling applications. The blower type fan provides a desired airflow while also having the advantage of being somewhat quiet. Noise generated by the fan may detract from the performers. Accordingly, the fan 30 is placed a distance away from the riser structure 22 and the performers in order to limit any undue noise that could detract from a performance. The low noise fan provides for the substantial transparency of the system 20 with regard to any performance. Moreover, although the fan 30 is shown as mounted within the enclosure 44, a fan 30 may not be required if an existing HVAC system is available and provides a desired airflow to create the downdraft 34.

A shroud 46 is provided around the riser structure 22 to contain air circulation and define a space for the performers within the system 20. The shroud 46 includes side portions 58, 60, a back portion 62 and a top portion 56. The area in front of the riser section 22 is open to incoming fresh air flow 54. The shroud 46 maybe supported by any type of support structure. The shroud 46 may be supported by separate structures or by portions of a room including the riser structure 22. In this example, the top portion 56 is angled upward much like an acoustic choral shell. The shroud 46 may include a structure that further provides desired acoustic properties in addition to the containment function.

Figure 3:
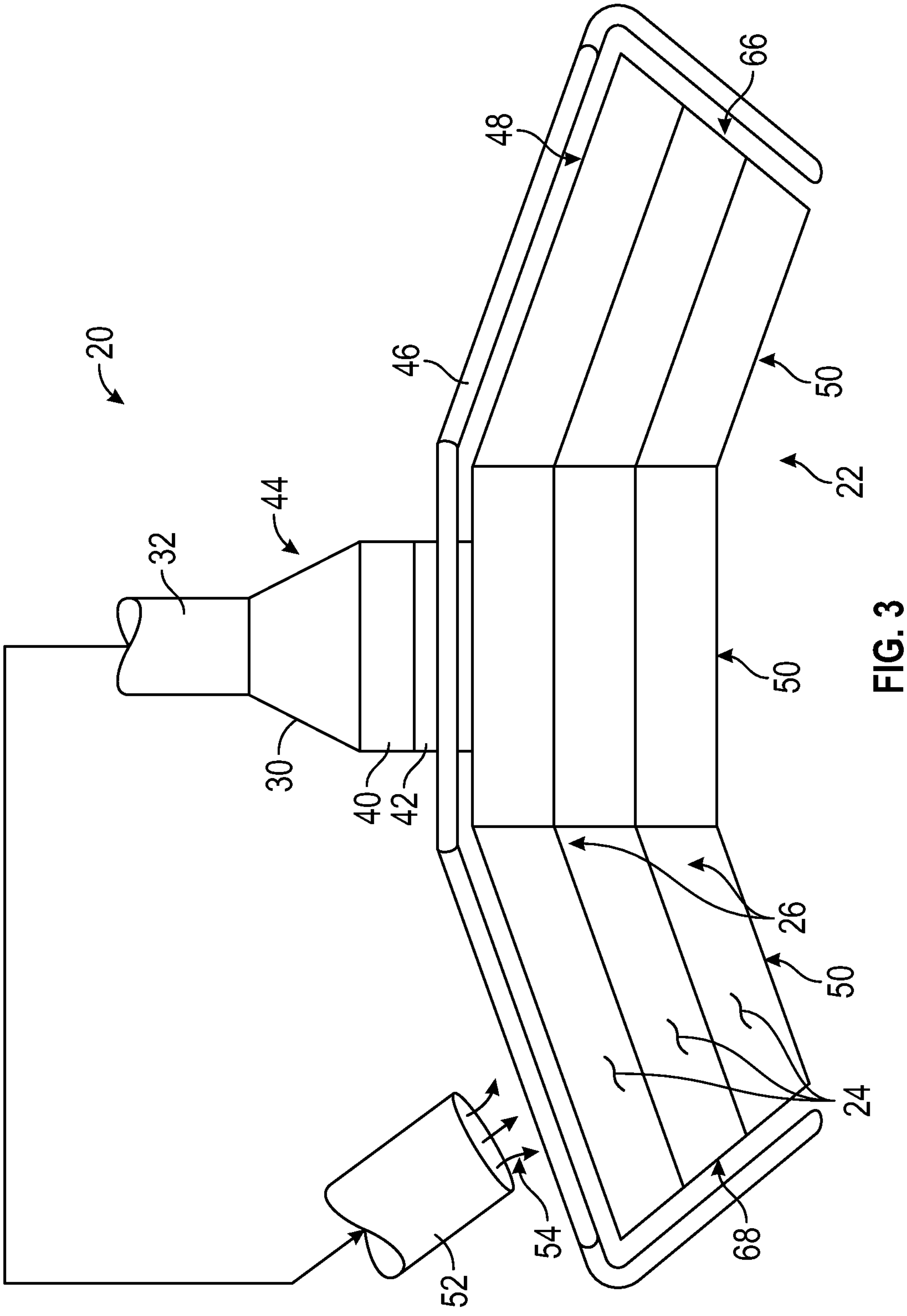
FIG. 3 is a top schematic view of the disclosed air circulation system for vocal music and band ensembles.

Referring to FIG. 3, with continued reference to FIGS. 1 and 2, the enclosure 44 is disposed in a center location at a back of the riser structure 22. The enclosure 44 may be fabricated from steel, such as is used for HVAC ductwork, wood, plastic, or any other material with sufficient structure to support operation of the fan 30, filter and decontamination device 42.

In this disclosed example, airflow leaving the inner chamber 28 (FIG. 1) first proceeds through the decontamination device 42, then through the filter 40. However, the filter 40, or another filter may be placed prior to the decontamination device 42. Air flow through the filter 40 is driven by the fan 30 into an exhaust duct 32. The exhaust duct 32 directs air away from the riser structure 22 to prevent disturbance of the downdraft airflow created above the platforms 24.

Airflow driven through the fan 30 has been filtered and decontaminated and therefore may be reintroduced into any existing building HVAC system. Moreover, the system 20 may include a return duct 52 that communicates the now clean, fresh air 54 back to a front of the riser structure 22 to create circulation loop of airflow. The recirculated air back to the front of the riser structure 22 provides for control of the air quality and reduces comingling of air that may not have been filtered and decontaminated. The return duct 52 is directed and baffled in a manner that does not disturb the downdraft generated through the riser structure 22.

The exhaust duct 32 and the return duct 52 may be formed from duct work, tubing, flexible tubing, and/or any structures utilized in air handling systems. In this example, the exhaust duct 32 is a flexible tubing with some insulative properties to reduce noise caused by airflow. Moreover, the enclosure 44 may also include insulation to provide for temperature stabilization as well as reduction in any noise from the fan 30.

In this example, a single enclosure 44 is shown with a single fan 30, filter 40 and decontamination device 42. However, multiple enclosures 44 could be placed in communication with the inner chamber 28 (FIG. 1) to provide a desired airflow given a size and shape of the riser structure 22. For example, larger riser structures 22 may include two or more enclosures 44, each including a fan 30, filter 40 and decontamination device 42 to provide a desired downdraft. Moreover, each of the enclosures could feed into a common exhaust duct 32 or into different exhaust ducts 32. The system 20 may therefore be scaled to provide a desired airflow for differently shaped and sized riser structures.

In operation, the system 20 is turned on by powering the fan 30. The fan 30 blows air through the exhaust duct 32 to generate a low pressure region within the inner chamber 28. The size and speed of the fan 30 is adapted to the size of the riser structure 22. A downdraft 34 is produced that draws air from around performers standing on the platforms 24 down through the air intakes 26. The air intakes 26 are disposed within the vertical space between platforms 24. In this way, the platforms 24 do not require any modification or alteration that may changes the design stability of the riser structure 22. Once the performers begin singing, speaking, and/or playing, any generated airborne aerosol and/or droplets are immediately pulled downward by the downdraft 34. The downdraft 34 therefore substantially prevents lingering of any airborne aerosol. The input of fresh air 54 from the return duct 52 may further aid in pushing airborne aerosols into the inner chamber 28 and away from the performers.

The pulled in air is directed under the riser structure 22, through the inner chamber 28 and into the enclosure 44. In the enclosure, the drawn in air is decontaminated, filtered, and pushed into the exhaust duct 32. From the exhaust duct 32 airflow may be recirculated by way of the return duct 52, introduced back into an existing HVAC system and/or exhausted a distance away from the riser structure 22. The system continues drawing air into the air intakes 26 to maintain a substantially aerosol free environment for the performers supported on the riser structure 22.

Figure 4:
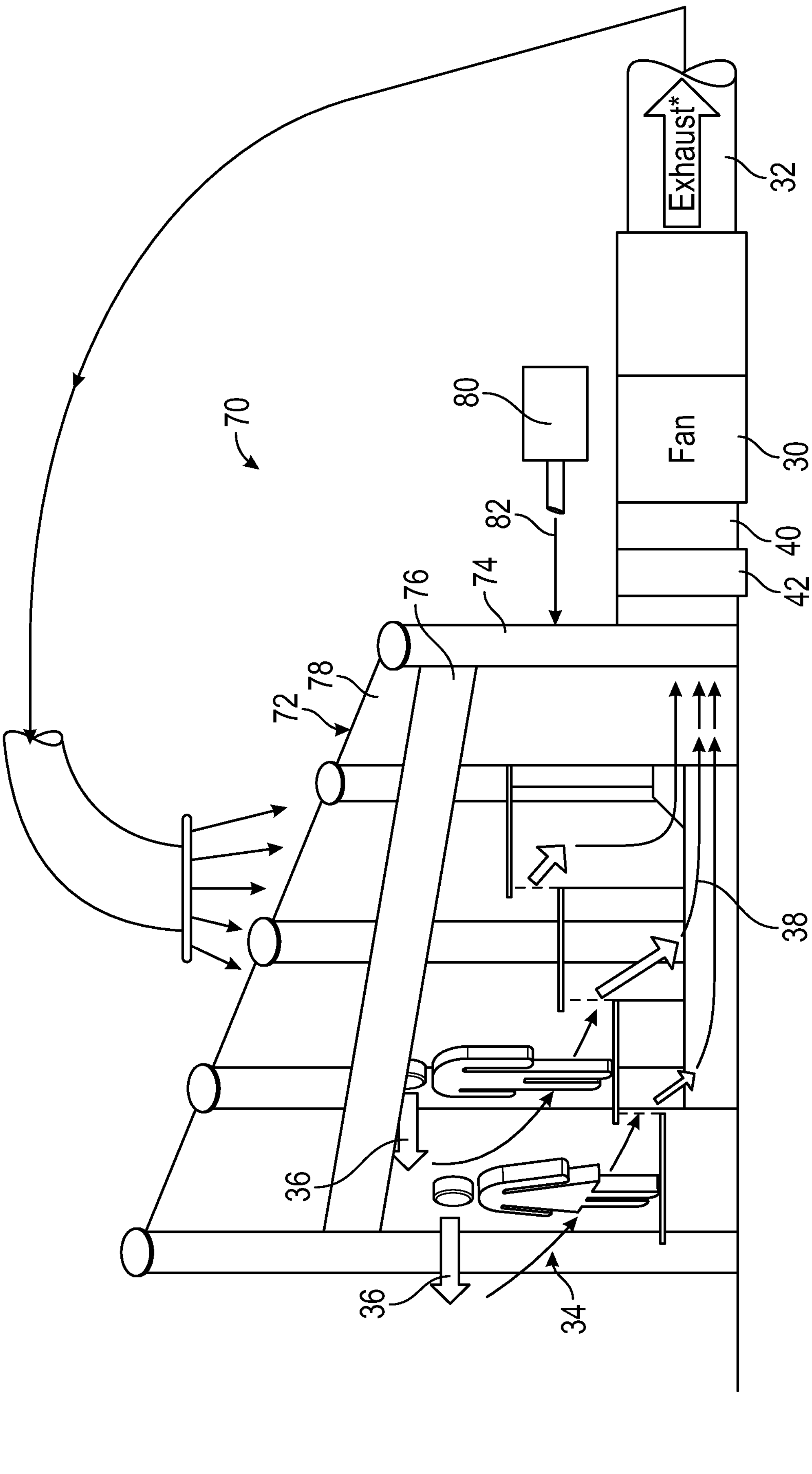
FIG. 4 is a schematic view of another disclosed embodiment of an air circulation system for vocal music and band ensembles.

Referring to FIG. 4, another air circulation system for vocal and band ensembles is schematically shown and indicated at 70. The example system 70 includes the same features as described above with regard to system 20 with the addition of another example shroud structure 72. The example shroud structure 72 includes inflatable columns 74 and inflatable structures 76 for supporting sheets 78. The inflatable columns 74 and structures 76 are filled with a flow of air 82 from an air pump 80. The inflatable structures 76 could be of any form attached between the columns 74 that aid in stabilizing the shroud structure 72. The flow of air 82 may be continuous or may be utilized to inflate the columns 74 and structures 76 once during setup. The use of the inflatable columns 74 and structures 76 provides for portability of the system 70 and eases set up. As appreciated, the systems 20 and 70 are adaptable to existing riser structures 22. The systems 20, 70 could be moved to fit to existing riser structures at a performance venue to provide some protection to performers and spectators.

Accordingly, the disclosed air circulation systems safely remove aerosols emitted during vocal performances to provide a substantially unrestricted and safe environment rehearsal and performance.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An air circulation system for vocal music and band ensembles comprising:

a riser structure configured to sit on a flat surface, the riser structure including:

a plurality of vertically spaced apart platforms including front walls between the vertically spaced apart platforms, side walls and a back wall, an inner chamber defined by the front walls between the vertically spaced platforms, the side walls, and the back wall, a plurality of air intake openings disposed in the front walls between the vertically spaced platforms;

an airflow generator configured to generate a vacuum within the inner chamber to draw air through the plurality of air intake openings and into the inner chamber; and an exhaust duct communication with the inner chamber for directing air drawn in through the plurality of air intake openings away from the riser structure.

2. The system as recited in claim 1, further comprising at least one filter for removing particulates within the air drawn through the plurality of air intake openings.

3. The system as recited in claim 1, including a decontamination device disposed between the inner chamber and the airflow generator for treating air drawn through the plurality of air intake openings.

4. The system as recited in claim 3, wherein the decontamination device comprises an ultraviolet light emitting device.

5. The system as recited in claim 1, including a shroud disposed along at least one of the side walls and back wall of the riser structure, the shroud extending to a height above a top one of the platforms.

6. The system as recited in claim 1, including a fresh air return duct communicating airflow to a position over the plurality of platforms.

7. A riser structure for vocal music and band ensembles comprising:

a plurality of vertically spaced apart platforms;

a front wall between each of the vertically spaced apart platforms;

side walls on each side of the platforms;

an inner chamber defined by the front walls, the side walls, and a back wall;

a plurality of air intake openings disposed in the front walls between the vertically spaced platforms; and an airflow generator in flow communication with the inner chamber through an enclosure, the airflow generated configured to draw air into the inner chamber through the plurality of air intake openings.

8. The riser structure as recited in claim 7, including an exhaust duct in communication with the airflow generator for directing air drawn in through the plurality of air intake openings away from the riser structure.

9. The riser structure as recited in claim 7, further comprising at least one filter disposed between the plurality of air intake openings and the airflow generator for removing particulates within the air drawn through the plurality of air intake openings.

10. The riser structure as recited in claim 9, including a decontamination device disposed between the plurality of air intake openings and the airflow generator for treating air drawn through the intake.

11. The riser structure as recited in claim 7, including a shroud disposed along at least one side of the riser structure, the shroud extending to a height above a top one of the plurality of platforms.

12. The riser structure as recited in claim 11, including a shroud support structure comprised of at least one inflatable frame held upright at least partially by a flow of air.

13. A method of removing aerosol particulates over a riser structure for vocal and band ensembles, the method comprising:

sealing a space under a plurality of platforms to define an inner chamber;

generating a reduced pressure within the inner chamber with an airflow generation device in communication with the inner chamber;

drawing air from above the plurality of platforms through at least one air intake vent disposed within a vertical space between at least two of the plurality of platforms; and exhausting the drawn in air from the inner chamber away from the riser structure.

14. The method as recited in claim 13, further comprising communicating air drawn from the inner chamber through a filter to remove at least some aerosol particulates.

15. The method as recited in claim 14, further comprising communicating air drawn from the inner chamber through a decontamination device to treat the air.

* * * * *